UNITED STATES PATENT OFFICE.

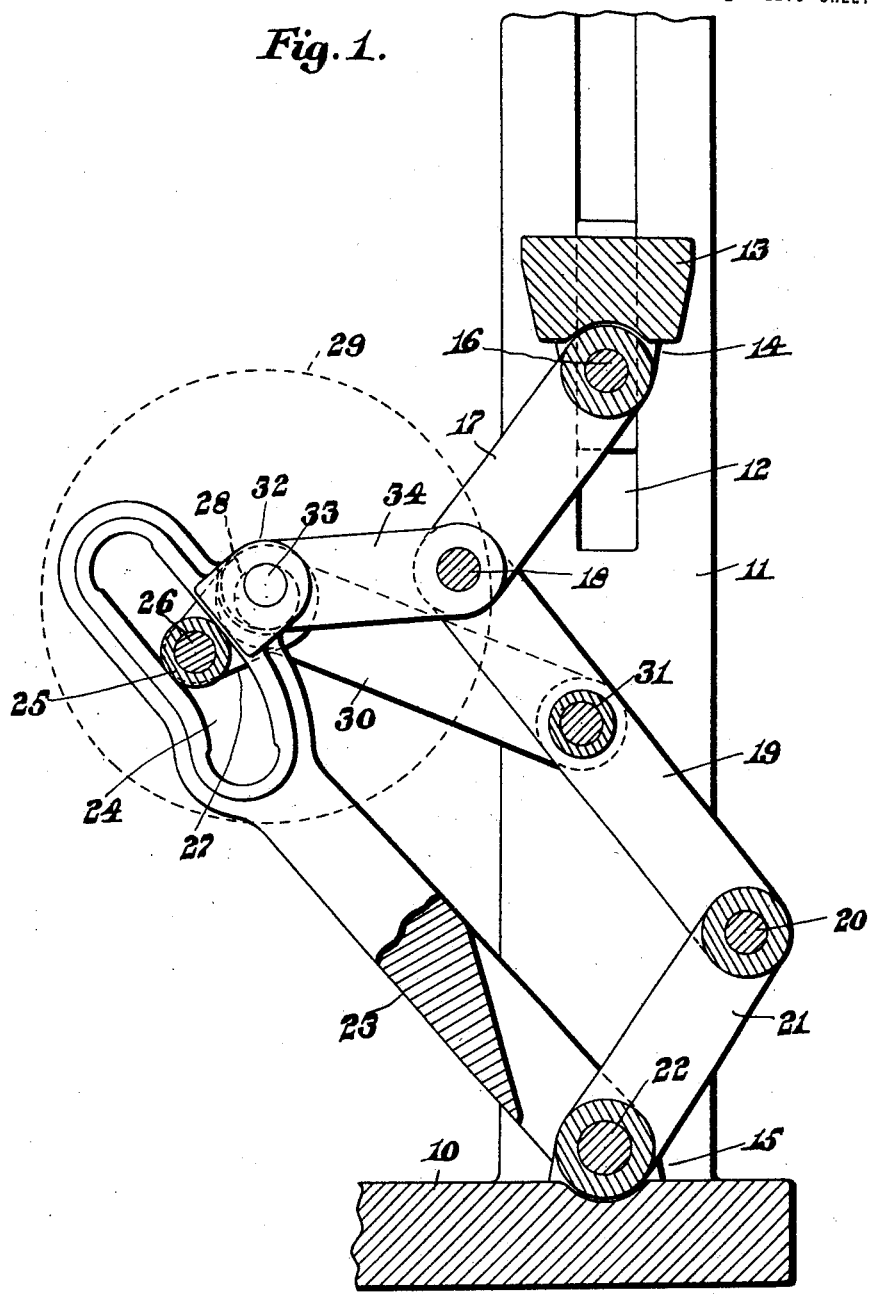

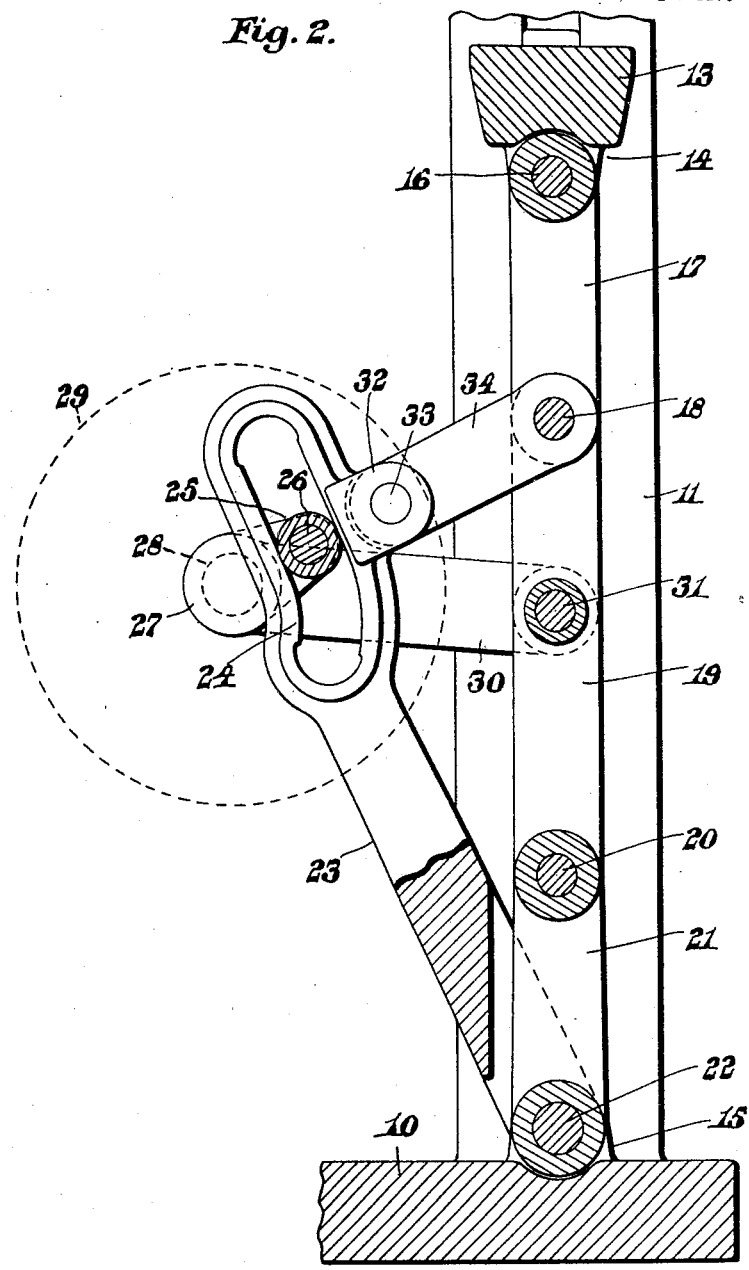

GEORGE W. PROUTY, OF MILTON, MASSACHUSETTS.

MECHANICAL MOVEMENT.

1,404,406.

Specification of Letters Patent. Patented Jan. 24, 1922.

Application filed April 22, 1921. Serial No. 463,446.

*To all whom it may concern:*

Be it known that I, GEORGE W. PROUTY, a citizen of the United States of America, and a resident of Milton, in the county of Norfolk and State of Massachusetts, have invented certain new and useful Improvements in Mechanical Movements, of which the following is a specification.

This invention relates to mechanical movements and has for its object the provision of a new device of this character which may be used in connection with many different forms of machines employed for various purposes.

The invention consists primarily in a double acting toggle mechanism and means for actuating the same.

The invention further consists in certain novel features of construction and arrangement of parts which will be understood readily by reference to the description of the drawings and to the claims hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings:

Figure 1 represents a vertical section of a device embodying the principles of the present invention with the parts thereof in their normal position, and Figure 2 represents a similar view of the same with the toggle members in alinement.

Similar characters indicate like parts throughout the several figures of the drawings.

In the drawings, 10 is a fixed base having an upright 11 provided with a guide-way 12 in which is adapted to be moved the part 13.

This part 13 preferably has downwardly extending ears 14 in alinement with upwardly extending ears 15 formed upon the fixed base 10.

In the ears 14 is a pivot pin 16 extending through one end of a link 17, the opposite end of which is connected by a pivot pin 18 with a member 19, the opposite end of which is connected by a pivot pin 20 to a link 21, the opposite end of which is pivoted to the stud 22 mounted in the ears 15.

The stud 22 has pivotally connected thereto, an oscillating arm 23 the free end of which is provided with an elongated slot 24 in which is mounted a roller 25 on a crank pin 26.

This crank pin 26 extends laterally from the crank 27 secured to the revoluble shaft 28 adapted to be rotated by any suitable member such as a pulley or gear, this driving member being indicated by the dotted circle 29.

Pivotally mounted on the shaft 28 is one end of a bar 30, the opposite end of which is provided with a pin 31 extending through the member 19 at a point intermediate its ends and thereby forming a fulcrum for said member.

The oscillating arm 23 has a lateral ear 32 provided with a pin 33 extending through one end of a connector 34, the opposite end of which is pivotally mounted upon the pivot pin 18.

As the crank 27 is rotated with the shaft 28, the arm 23 will be oscillated about the axis of the stud 22.

During the oscillation of the arm 23, the connector 34 pivoted to the ear 32 on said arm 23 will cause the toggle members 17, 19 and 21 to be straightened as indicated in Fig. 2 of the drawings or broken as indicated in Fig. 1 of the drawings.

The stud 22 being a fixed part during the straightening of the toggle mechanism, 17, 19 and 21, the movable part 13 will be moved upwardly on the upright.

During the straightening or breaking of the toggle mechanism 17, 19 and 21, the bar 30 is adapted to swing about the fixed axis of the rotatable shaft 28.

The pin 31 in the free end of the bar 30 serves as a fulcrum for the member 19 and this member 19 and the links 17, 21 combined form a double toggle mechanism.

When the toggle mechanism is in the position indicated in Fig. 1, the movable part 13 will be in its lowest position and at every rotation of the crank shaft 28 the roller 25 on the crank pin 26 will move the arm 23 about the axis of the stud 22 and by means of the connector 34 will force the links 17, 21 and the member 19 into a straight line as indicated in Fig. 2 of the drawings and thereby causing an upward movement of the part 13.

By means of this double toggle mechanism, the required movement of the movable part 13 may be attained with a very short movement of the arm 23 and connector 34.

Obviously this is of great advantage in many classes of machines where it is desired to economize space.

It is believed that the operation and many advantages of the invention will be understood without further description.

Having thus described my invention, I claim:

1. The combination of a revoluble shaft; a crank thereon; a bar one end of which is pivotally mounted on said shaft; a member pivoted intermediate its ends to the opposite end of said bar; a fixed part; a movable part; links between said parts and the opposite ends of said member; and connecting mechanism between one end of said member and said crank.

2. The combination of a fixed part; an oscillating arm thereon having a slot; a revoluble shaft; a bar pivoted at one end to said shaft; a member pivoted intermediate its ends to the opposite end of said bar; a movable part; links between the opposite ends of said member and said fixed and movable parts; and a connector between one end of said member and said oscillating arm.

3. The combination of a fixed part; a movable part; a link pivoted at one end to each of said parts; a member the opposite ends of which are pivotally connected to the opposite ends of said links; a movable fulcrum for said member intermediate its ends; and a crank mechanism connected to one end of said member.

4. The combination of a fixed part; a movable part; a link pivoted at one end to each of said parts; a member the opposite ends of which are pivotally connected to the opposite ends of said links; a movable fulcrum for said member intermediate its ends consisting of a bar pivotally connected to said member at one end with its opposite end movable about a fixed axis; and a crank mechanism connected to one end of said member.

5. The combination of a stud; an oscillating arm thereon; a link pivoted at one end to said stud; a member pivoted at one end to the opposite end of said link; a second link pivoted to the opposite end of said member by a pin; a movable part pivoted to the opposite end of the second link; a connector between said arm and pin; a swinging fulcrum for said member; and means for oscillating said arm.

6. The combination of a frame having upwardly extending ears; a slidable member on said frame having downwardly extending ears in alinement with the first-mentioned ears; links pivoted to said ears; a member connected at opposite ends by pivot pins to the opposite ends of said links; a movable fulcrum for said member; and means connected to one end of said member for bringing said member and links into alinement.

7. The combination of a frame having upwardly extending ears; a slidable member on said frame having downwardly extending ears in alinement with the first-mentioned ears; links pivoted to said ears; a member connected at opposite ends by pivot pins to the opposite ends of said links; a swinging arm provided at its free end with a fulcrum for said member; and means connected to one end of said member for bringing said member and links into alinement.

8. The combination of a frame having upwardly extending ears; a slidable member on said frame having downwardly extending ears in alinement with the first-mentioned ears; links pivoted to said ears; a member connected at opposite ends by pivot pins to the opposite ends of said links; a pivoted bar having its free end articulated to said member intermediate its ends; and means connected to one of said pivot pins for bringing said member and links into alinement.

9. The combination of a frame having upwardly extending ears; a slidable member on said frame having downwardly extending ears in alinement with the first-mentioned ears; links pivoted to said ears; a member connected at opposite ends by pivot pins to the opposite ends of said links; a pivoted bar having its free end articulated to said member intermediate its ends; an oscillating arm; means for oscillating said arm; and a connector between said arm and one of said pivot pins.

Signed by me at 294 Washington St., Boston, Mass., this 20th day of April, 1921.

GEORGE W. PROUTY.

Witnesses:
WALTER E. LOMBARD,
NATHAN C. LOMBARD.